Patented May 12, 1936

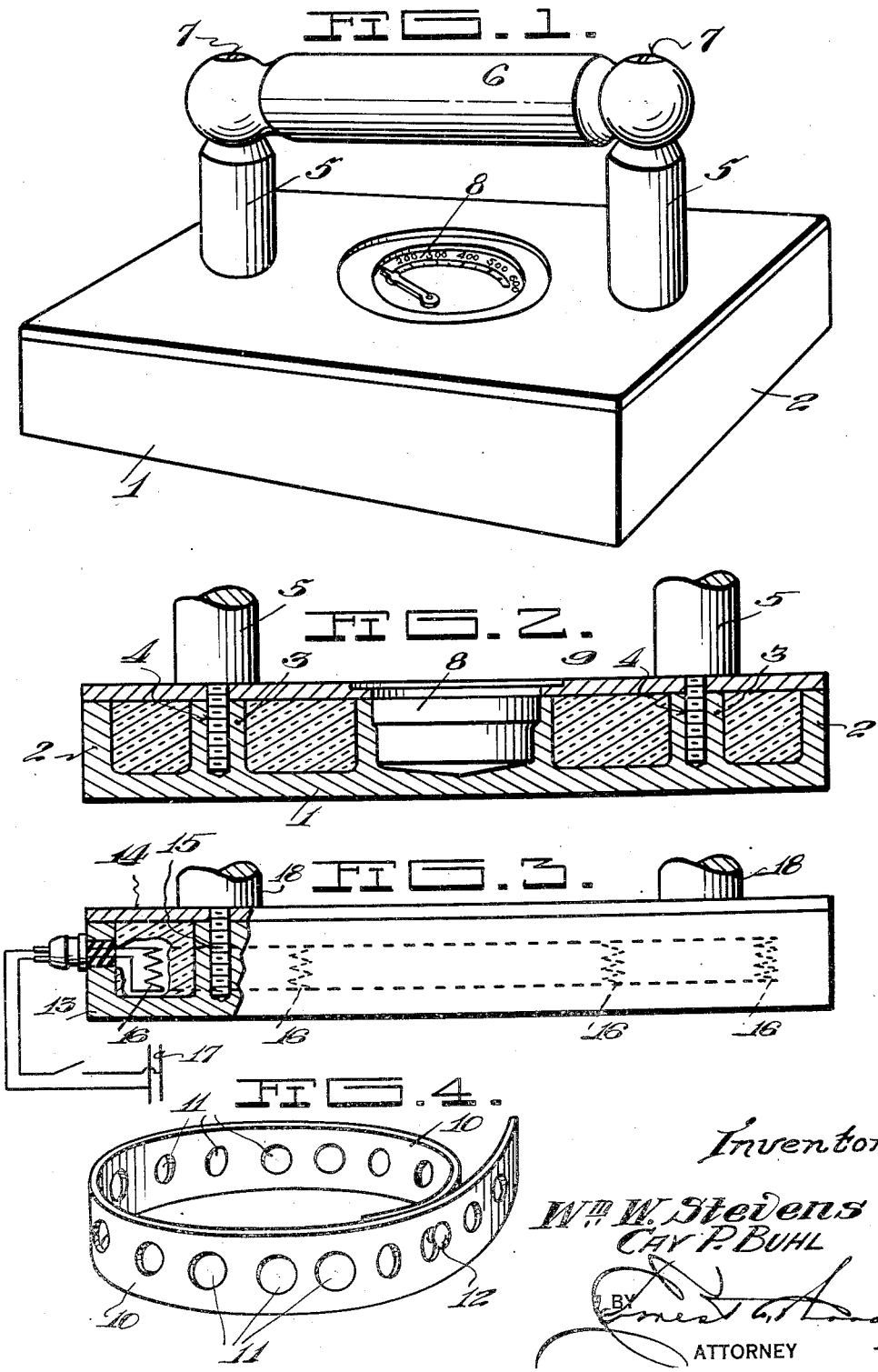

2,040,676

UNITED STATES PATENT OFFICE 2,040,676

COOKING UTENSIL

William W. Stevens and Cay P. Buhl, Dallas, Tex.

Application June 17, 1935, Serial No. 26,988

2 Claims. (Cl. 53—10)

This invention relates to food cooking utensils and it has particular reference to top fryers for steaks, chops and the like.

The principal object of the invention is to improve upon present methods of cooking meats and other foodstuffs by cooking both the top and bottom simultaneously so that a uniform cook is obtained. This applies particularly in cooking small steaks, chops, hamburger meat and other such articles of food prepared while the customer awaits the order.

Another object of the invention is to effect a saving, in that fragments of meat may be combined to have the appearance of an uncut portion which latter is comparatively expensive and while the fragments are none the less palatable, they may be served, through the medium of the invention much the same as single cuts of meat.

The invention aims to expedite the cooking of meats for immediate service, saving approximately half of the usual time required for cooking and providing the consumer with a more delectable and tasty article of food.

The invention aims to afford a device as specified which is designed to retain the heat of a hot plate or griddle or may employ as its heating medium, electricity.

With the foregoing objects as paramount, the invention has particular reference to its salient features of construction and arrangement of parts to become manifest as the description proceeds, taken in connection with the accompanying drawing, wherein:

Figure 1 is a perspective view of a top fryer, constructed according to the present invention.

Figure 2 is a longitudinal sectional view of the structure shown in Figure 1.

Figure 3 is a modification of the invention shown in Figures 1 and 2 inasmuch as it is electrically heated, and Figure 4 is a detail view in perspective showing the device for retaining food for cooking by the invention.

Continuing with a more detailed description of the invention, reference is primarily made to Figures 1 and 2 in which 1 designates a casting, preferably aluminum, having side walls 2 and interiorly threaded projections 3 extending upwardly for the reception of screws 4 fixed to the posts 5, which are constructed of a suitable heat resisting material such as fibre, synthetic resin or the like. A handle member 6 spans the posts 5 and is secured by screws 7.

Centrally disposed between the projections 3 is a heat indicator or thermometer 8, disposed in a cast sleeve in receptacle 9 provided therefor. This thermometer is conventional and it is therefore considered unnecessary to go into detail concerning the structure thereof.

The space between the projections 3 and 9 is filled with a suitable heat retaining material such as porcelain, plaster of Paris or such other material as will effectually retain heat.

Obviously, when the device described is allowed to rest upon a griddle, hot-plate or the like for a period of time, it becomes hot to a degree sufficient to cook an article of food and when placed on an order of food, resting on a hot plate, griddle or the like, the top as well as the bottom is cooked, insuring a uniform cook.

A device such as illustrated in Figure 4 is provided to retain the article to be cooked and consists of a metallic band 10 having perforations 11. By arranging the pieces of meat or other foodstuff within the band and adjusting it through the medium of the pin 12 cooperating with the apertures 11 to lock the band to a definite or predetermined diameter the article of food is made ready to cook on a hot plate or the like and by placing the invention on top of the adjustable band 10, both the top and bottom may be cooked.

The structure shown in Figure 3 is a modified example of the invention and comprises a shell 13 having a cover 14 affixed to the shell by means of the screws 15 which retain the pins 18 to which the handle, not shown, is secured. This structure anticipates an electrical arrangement in which coils 16 are provided, receiving current from source 17. These coils are resistances embedded in the non-conducting material 18, and are preferably arranged in parallel as shown. Obviously the arrangement just described can be used in lieu of the construction previously described, but the latter construction provides for a continuous and uniform heating while the former arrangement is dependent upon heat from the hot plate.

Manifestly the construction shown is capable of considerable modification, and such modification as may be considered within the scope and meaning of the appended claims is also considered within the spirit and intent of the invention.

What is claimed is;

1. A top cooking device comprising a shell, projections rising from the base of the shell, a sleeve rising from said base and disposed between the projections, a cover for the shell, a handle assembly secured to the projections, heat retaining material surrounding the projections and sleeve, and a heat indicating device confined in the sleeve.

2. A top cooking device comprising a shell having projections rising from its base, a sleeve rising from the base and disposed between the projections, heat conserving material in the shell and surrounding the projections and sleeve, a cover mounted on the shell, handle posts engaged with the cover and having screws carried thereby for threaded engagement in the projections, and a heat indicating device confined in the sleeve.

WILLIAM W. STEVENS.
CAY P. BUHL.